United States Patent
Sugiyama et al.

(10) Patent No.: US 11,860,142 B2
(45) Date of Patent: Jan. 2, 2024

(54) LIQUID CHROMATOGRAPH MASS SPECTROMETER

(71) Applicant: Hitachi High-Tech Corporation, Tokyo (JP)

(72) Inventors: Masuyuki Sugiyama, Tokyo (JP); Yuichiro Hashimoto, Tokyo (JP); Hideki Hasegawa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 467 days.

(21) Appl. No.: 17/296,317

(22) PCT Filed: Oct. 25, 2019

(86) PCT No.: PCT/JP2019/042053
§ 371 (c)(1),
(2) Date: May 24, 2021

(87) PCT Pub. No.: WO2020/121660
PCT Pub. Date: Jun. 18, 2020

(65) Prior Publication Data
US 2022/0050091 A1 Feb. 17, 2022

(30) Foreign Application Priority Data
Dec. 10, 2018 (JP) ................. 2018-230775

(51) Int. Cl.
*G01N 30/72* (2006.01)
*G01N 30/32* (2006.01)
(Continued)

(52) U.S. Cl.
CPC ....... *G01N 30/7266* (2013.01); *G01N 27/623* (2021.01); *G01N 30/32* (2013.01); *G01N 30/46* (2013.01); *G01N 2030/027* (2013.01)

(58) Field of Classification Search
CPC .. G01N 30/7266; G01N 27/623; G01N 30/32; G01N 30/46; G01N 2030/027
See application file for complete search history.

(56) References Cited

U.S. PATENT DOCUMENTS

| 2006/0171855 A1 | 8/2006 | Yin et al. |
| 2007/0181801 A1 | 8/2007 | Yamada et al. |
| (Continued) | | |

FOREIGN PATENT DOCUMENTS

| JP | 2000249694 A | 9/2000 |
| JP | 2001-153875 A | 6/2001 |
| (Continued) | | |

OTHER PUBLICATIONS

Search Report dated Jan. 21, 2020 in International Application No. PCT/JP2019/042053.
(Continued)

*Primary Examiner* — Kristina M Deherrera
*Assistant Examiner* — Jean F Morello
(74) *Attorney, Agent, or Firm* — Miles & Stockbridge, P.C.

(57) ABSTRACT

A liquid chromatograph mass spectrometer specifying a location where a flow path is clogged and recovering in a short time. The liquid chromatograph mass spectrometer includes a first flow path passing through a separation column, a second flow path not passing through the separation column, a mass spectrometry unit on the downstream side of the first and second flow paths that analyzes a sample that has passed through the first flow path, a first valve for connecting any one of the first and second flow paths to the mass spectrometry unit, and a controller for controlling driving of the first valve connecting the first flow path to the mass spectrometric unit, comparing the measured value of the mass spectrometric unit with a predetermined threshold (Continued)

value, and connecting the second flow path to the mass spectrometry unit when it is determined to be abnormal.

7 Claims, 5 Drawing Sheets

(51) Int. Cl.
  *G01N 30/46* (2006.01)
  *G01N 30/02* (2006.01)
  *G01N 27/623* (2021.01)

(56) References Cited

U.S. PATENT DOCUMENTS

| | | | |
|---|---|---|---|
| 2010/0250174 | A1 | 9/2010 | Tokunaga et al. |
| 2012/0255341 | A1 | 10/2012 | Nozaka et al. |
| 2017/0276652 | A1 | 9/2017 | Funada |
| 2018/0269047 | A1 | 9/2018 | Zhu |
| 2021/0148869 | A1* | 5/2021 | Yokoi .................. G01N 30/20 |
| 2021/0223218 | A1 | 7/2021 | Maekawa |

FOREIGN PATENT DOCUMENTS

| | | |
|---|---|---|
| JP | 2004-354144 A | 12/2004 |
| JP | 2005257609 A | 9/2005 |
| JP | 2006215033 A | 8/2006 |
| JP | 2007213934 A | 8/2007 |
| JP | 2008209334 A | 9/2008 |
| JP | 2010-236962 A | 10/2010 |
| JP | 2012145513 A | 8/2012 |
| JP | 2012220245 A | 11/2012 |
| JP | 2015-052533 A | 3/2015 |
| WO | WO2017050096 A1 | 3/2017 |
| WO | 2017103180 A1 | 6/2017 |
| WO | 2017164417 A1 | 9/2017 |
| WO | 2017-216934 A1 | 12/2020 |

OTHER PUBLICATIONS

Written Opinion dated Jan. 21, 2020 in International Application No. PCT/JP2019/042053.
International Preliminary Report on Patentablity dated Sep. 17, 2020 in International Application No. PCT/JP2019/042053.
Search Report dated Feb. 8, 2022 in International Application No. PCT/JP2021/044230.
Written Opinion dated Feb. 8, 2022 in International Application No. PCT/JP2021/044230.
Search Report dated Jul. 15, 2022 in European Application No. 19897194.7.

* cited by examiner

LIQUID CHROMATOGRAPH MASS SPECTROMETER

TECHNICAL FIELD

The present disclosure relates to a liquid chromatograph mass spectrometer.

BACKGROUND ART

A mass spectrometer is an apparatus that ionizes a sample solution, introduces the ions into a vacuum device, separates and detects ions according to the mass-to-charge ratio (m/z), and can detect ions with high sensitivity and high accuracy. The mass spectrometer is generally used as a detector for, for example, a liquid chromatograph (LC), and a sample is analyzed by an analytical method called liquid chromatography-mass spectrometry (LC-MS).

The liquid chromatography is a method in which a mobile phase containing a sample is pressurized with a liquid feed pump to pass through a separation column, and the sample is separated according to the difference in interaction (adsorption, partitioning, etc.) with the stationary phase of the separation column. The separation column is densely packed with fine porous particles as a stationary phase so that interaction with the sample is likely to occur. Therefore, if foreign matter such as dust is mixed in or impurities such as salt are accumulated, the separation column may be clogged and the sensitivity may be lowered. When the separation column is clogged, the conductance decreases and the pressure of the solution increases.

Since a general LC liquid feed pump is equipped with a pressure gauge, it is possible to detect whether the separation column is clogged by a change in pressure when a constant flow rate of liquid is fed.

In PTL 1, as a method of determining whether the flow path is clogged, it is disclosed that "a second flow path 18 that can be switched by a valve 15 is provided on the analysis flow path 8, and a flow meter 17 is provided in the second flow path 18. The presence or absence of clogging is determined by measuring the flow rate when necessary" (see Abstract of the same document).

CITATION LIST

Patent Literature

PTL 1: JP 2000-249694 A

SUMMARY OF INVENTION

Technical Problem

When the flow path through which the sample flows is clogged, it is necessary to specify the clogged location and remove the clogging in order to recover from the decrease in sensitivity due to the clogging of the flow path. However, in a known liquid chromatograph mass spectrometer, it is necessary for the user to manually specify the clogged location, and it takes a long time to specify the clogged location.

Further, in PTL 1, if the flow rate is constant, the pressure of the solution rises in inverse proportion to the conductance of the flow path, so that it is possible to detect a decrease in conductance due to clogging of the flow path. However, with the method described in PTL 1, the presence or absence of clogging can be confirmed only for the separation column, and it is not possible to specify which part of the flow path from the LC to the mass spectrometer is clogged. In particular, a method for automatically detecting clogging or leakage of a flow path on the downstream side (mass spectrometer side) of the separation column has not been known so far.

Therefore, the present disclosure provides a liquid chromatograph mass spectrometer capable of automatically specifying a location where a flow path is clogged and recovering in a short time.

Solution to Problem

In order to solve the above problems, a liquid chromatograph mass spectrometer of the present disclosure includes a first flow path that passes through a separation column, a second flow path that does not pass through the separation column, a mass spectrometry unit that analyzes a sample that has passed through the first flow path, a first valve that connects any one of the first flow path and the second flow path to the mass spectrometry unit, a controller that controls driving of the first valve, and a pressure gauge that measures a pressure of the second flow path and outputs the pressure to the controller. The controller connects the first flow path to the mass spectrometry unit when the sample is analyzed in the mass spectrometry unit, and drives the first valve to connect the second flow path to the mass spectrometry unit in a case where it is determined to be abnormal when the measured value of the mass spectrometry unit and a predetermined threshold value are compared.

Other features of the disclosure will be clear from the description and the accompanying drawings of this specification. In addition, embodiments of the disclosure are achieved and realized by elements, combinations of various elements, the following detailed description, and the attached claims.

It is necessary to understand that the description of this specification is given only as a typical example, and does not limit the scope of claims or applications of the disclosure.

Advantageous Effects of Invention

According to the present disclosure, it is possible to automatically specify a location where a flow path is clogged in a liquid chromatograph mass spectrometer and recover the clogging in a short time.

Objects, configurations, and effects besides the above description will be apparent through the explanation on the following embodiments.

DESCRIPTION OF EMBODIMENTS

First Embodiment

Apparatus Configuration

Figure 1:
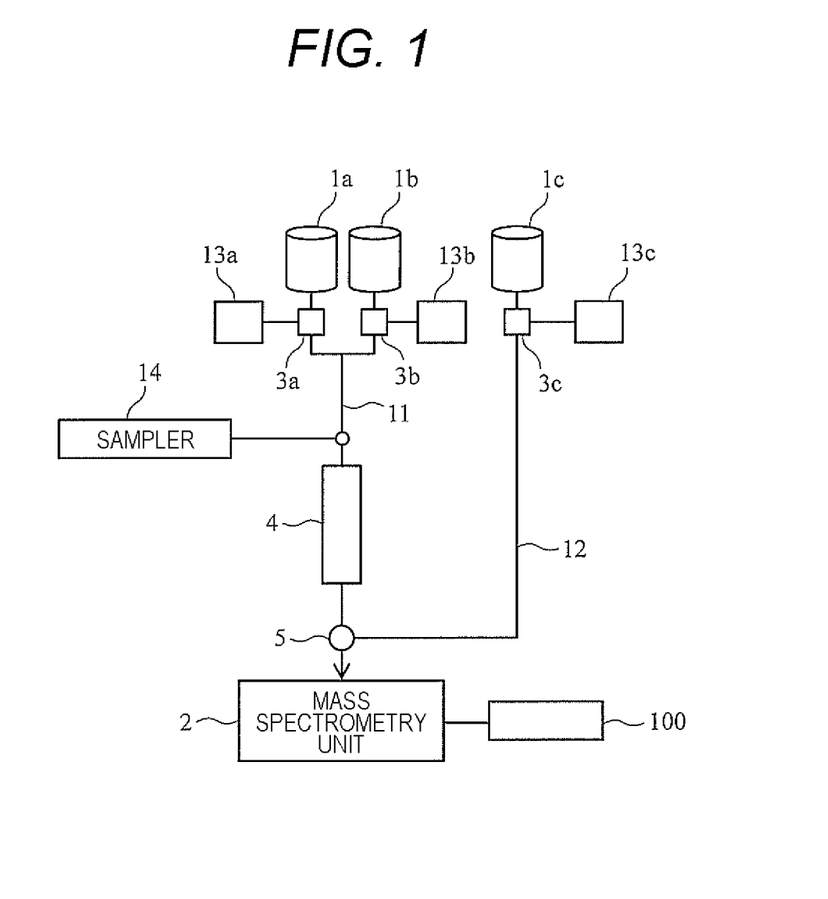
FIG. 1 is a schematic diagram illustrating a configuration of a liquid chromatograph mass spectrometer according to a first embodiment.

FIG. 1 is a schematic diagram illustrating a configuration of a liquid chromatograph mass spectrometer according to a first embodiment. The liquid chromatograph mass spectrometer includes solution tanks 1a to 1c, a mass spectrometry unit 2, liquid feed pumps 3a to 3c, a separation column 4, a selector valve 5 (first valve), a first flow path 11, and a second flow path 12, pressure gauges 13a to 13c, a sampler 14, and a controller 100.

The solution tanks 1a and 1b contain a solution to be a mobile phase. As the solution to be the mobile phase, a solution generally used in liquid chromatography can be used depending on a sample. For example, water, an aqueous solution of salts, an organic solvent such as methanol, acetonitrile or hexane may be used alone, or can be mixed and used. The solution tanks 1a and 1b are connected to the first flow path 11 via the liquid feed pumps 3a and 3b (first liquid feed pump), respectively.

The solution tank 1c contains a solution to be fed to the second flow path 12, and is connected to the second flow path 12 via the liquid feed pump 3c (second liquid feed pump). The solution contained in the solution tank 1c may be the same as or different from the solution contained in the solution tanks 1a and 1b.

The liquid feed pumps 3a to 3c pressurize and feed the solutions in the solution tanks 1a to 1c, respectively. The pressure gauges 13a and 13b are connected to the liquid feed pumps 3a and 3b that feed the solutions to the first flow path 11, respectively, and the pressure gauge 13c is connected to the liquid feed pumps 3c that feed the solution to the second flow path 12.

The pressure gauges 13a to 13c measure the pressure of the solution flowing through the flow path, respectively. It is preferable to use the pressure gauges 13a to 13c capable of measuring a pressure in a range that can be pressurized by the liquid feed pumps 3a to 3c, typically a pressure of about 0 to 200 MPa. If the dead volume of the pressure gauges 13a to 13c is large, the time required for the pressure of the solution to stabilize is long. Therefore, it is preferable to reduce the dead volume of the pressure gauges 13a to 13c, typically 10 µL or less.

The first flow path 11 and the second flow path 12 are composed of, for example, pipes. The sampler 14 is connected to the first flow path 11, and the separation column 4 is connected to the downstream side of the sampler 14. As the sampler 14, for example, an autosampler, a manual injector, or the like can be used. The sample is introduced into the first flow path 11 by the sampler 14. The second flow path 12 is a flow path that does not pass through the separation column 4, and no sample is introduced into the second flow path 12.

Since the first flow path 11 has the separation column 4 having a small conductance on the flow path, it is preferable to use the liquid feed pumps 3a and 3b capable of feeding the liquid, typically, at a pressure of 0.1 to 100 MPa in order to obtain a sufficient flow rate for analysis. On the other hand, since the second flow path 12 has a higher conductance than the first flow path 11, a liquid feed pump having a lower pressure upper limit than the liquid feed pumps 3a and 3b feeding the liquid to the first flow path 11 as the liquid feed pump 3c feeding the liquid to the second flow path 12.

The first flow path 11 and the second flow path 12 are connected to the selector valve 5, and by switching the selector valve 5, one of the first flow path 11 and the second flow path 12 is connected to the mass spectrometry unit 2. Details of the selector valve 5 will be described later. Hereinafter, in the liquid chromatograph mass spectrometer of this embodiment, the area from the solution tanks 1a and 1b to immediately before the mass spectrometry unit 2 may be referred to as a "liquid chromatograph (LC)".

Although not illustrated, the mass spectrometry unit 2 has components such as an ion source, a vacuum chamber, and an ion detector, which are provided by a general mass spectrometer (MS). The mass spectrometry unit 2 ionizes the sample introduced from the first flow path 11 with the ion source, introduces ions into the vacuum chamber, separates ions for each mass-to-charge ratio (m/z), and detects the ionic strength by the ion detector. The ion detector outputs a detection signal of the ionic strength to the controller 100. Alternatively, the ion detector may output the ion current as a detection signal to the controller 100.

Examples of the ion source include an electrospray ionization ion source, an atmospheric pressure chemical ionization ion source, and an atmospheric pressure photoionization ion source. In either ionization method, the solution containing the sample is sprayed into the vacuum chamber through a capillary of an ion source probe.

An inner diameter of an appropriate capillary depends on the flow rate of the liquid chromatograph (LC), and it is preferable to use a thinner capillary as the flow rate decreases. The inner diameter of a typical capillary is about 30 µm to 150 µm. When a capillary with an inner diameter larger than 150 µm is used, the ionization efficiency is lowered and the sample distribution is widened by diffusion while the solution flows through the capillary, so that the LC separability may be deteriorated. Since the capillary has a small inner diameter and may be heated depending on the ionization conditions, it is easily clogged due to the contamination of foreign substances and the accumulation of impurities.

The controller 100 is a computer terminal such as a personal computer, and is configured to control the operation of the entire liquid chromatograph mass spectrometer. Although not illustrated, the controller 100 includes a data processor that processes the detection signal (measured value) of the ion detector of the mass spectrometry unit 2, a storage that stores various data, an input unit for a user to input an instruction to the liquid chromatograph mass spectrometer, and a display for displaying the results of mass spectrometry and various GUI screens, and the like.

Figure 2A:
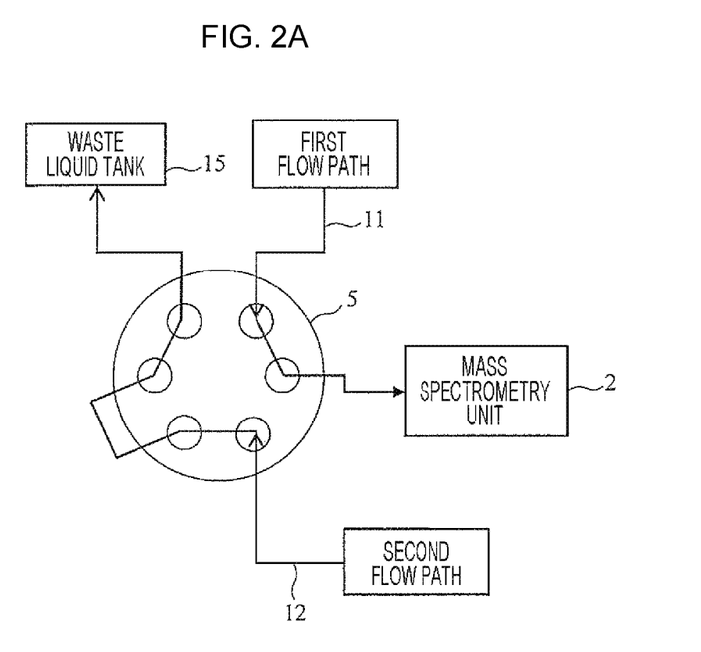
FIGS. 2A and 2B are schematic diagrams illustrating a connection example of flow paths by a selector valve.
Figure 2B:
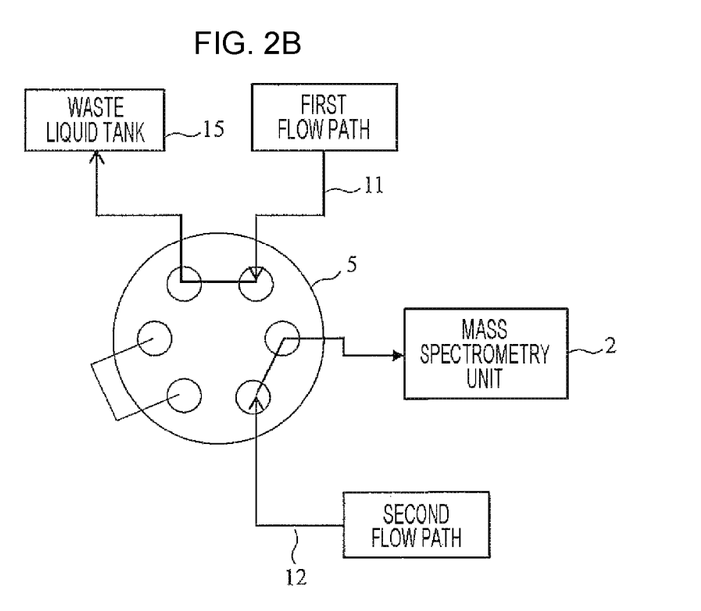

FIGS. 2A and 2B are schematic diagrams illustrating a connection example of the flow paths by the selector valve 5. FIG. 2A illustrates a state in which the first flow path 11 is connected to the mass spectrometry unit 2, and FIG. 2B illustrates a state that the second flow path 12 is connected to the mass spectrometry unit 2.

The controller 100 drives the selector valve 5 to switch the flow path connected to the mass spectrometry unit 2. In this way, either one of the first flow path 11 and the second flow path 12 is introduced into the mass spectrometry unit 2. As illustrated in FIGS. 2A and 2B, the flow path not connected to the mass spectrometry unit 2 is connected to a waste liquid tank 15, which prevents the solution from flowing out to the outside.

Operations

Figure 3:
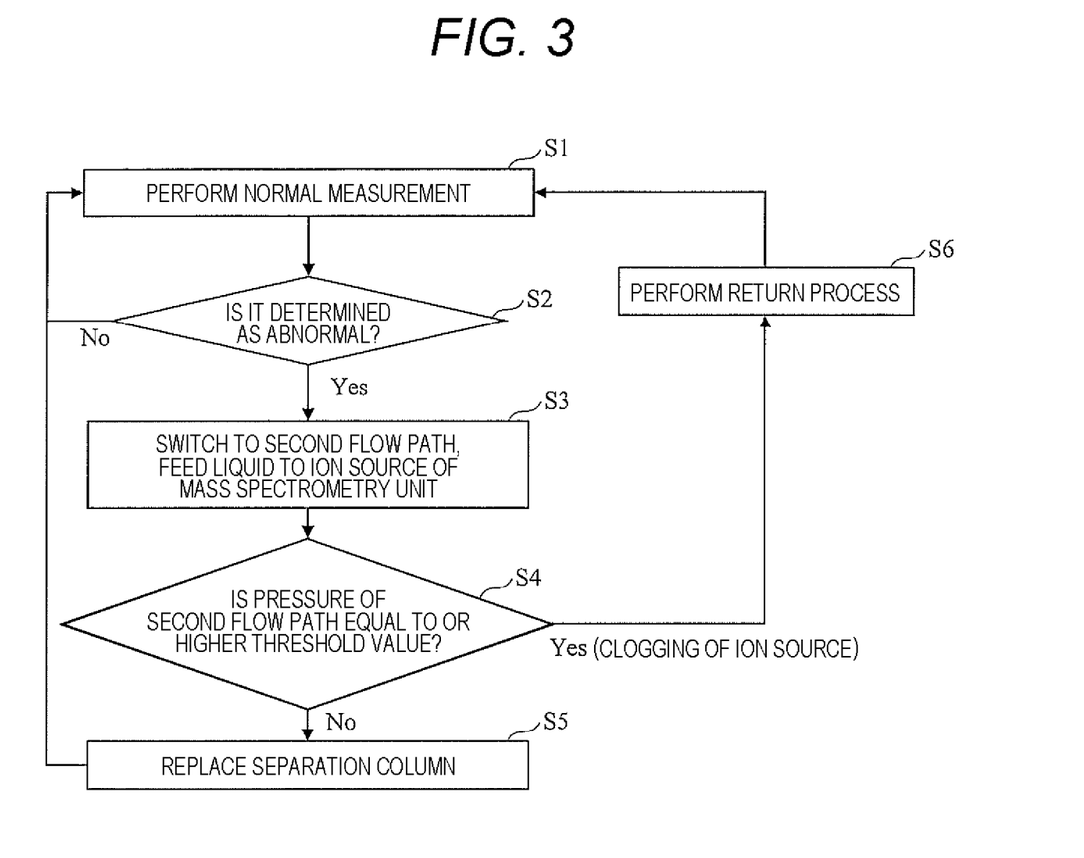
FIG. 3 is a flowchart illustrating the operation of the liquid chromatograph mass spectrometer according to the first embodiment.

FIG. 3 is a flowchart illustrating the operation of the liquid chromatograph mass spectrometer according to the first embodiment. The operation when an autosampler is used as the sampler 14 will be described below.

First, the user prepares a sample in advance and introduces it into the sampler 14. By adding an internal standard substance having a known concentration to the sample, the influence of adsorption on the flow path and instability of ionization can be eliminated, so that the signal strength of the sample can be accurately quantified. After introducing the sample into the sampler 14, the user inputs an operation start instruction from the input unit of the mass spectrometry unit 2.

Upon receiving the operation start instruction, the controller 100 operates the liquid chromatograph mass spectrometer in Step S1 to start normal measurement. That is, the controller 100 confirms that the first flow path 11 is connected to the mass spectrometry unit 2 by the selector valve 5 and drives the liquid feed pumps 3a and 3b to introduce the solution from the solution tanks 1a and 1b into the first flow path 11. The pressure gauges 13a and 13b output the pressure values of the liquid feed pumps 3a and 3b to the controller 100. Further, the controller 100 drives the sampler 14 to introduce the sample into the first flow path 11, and causes the mass spectrometry unit 2 to analyze the sample. The ion detector of the mass spectrometry unit 2 outputs the signal strength of the sample and the signal strength of the internal standard substance to the controller 100. The output signal of the ion detector may be an ionic strength or an ion current.

The data processor of the controller 100 obtains a chromatogram based on the output signal of the ion detector. The display of the controller 100 may receive a chromatogram from the data processor and display the chromatogram.

In Step S2, the controller 100 compares the signal strength of the internal standard substance or the output values of the pressure gauges 13a and 13b with a predetermined threshold value stored in the storage. In this way, the controller 100 determines whether there is an abnormality in the measurement. The predetermined threshold value is, for example, a value set based on the measured value obtained by the past measurement or the variation thereof, and the upper limit of the range of the values obtained by the normal measurement can be set as the threshold value. When the controller 100 determines that there is no abnormality (No), the controller 100 returns to Step S1 and continues the normal measurement.

If the controller 100 detects an abnormality (Yes), there is a high possibility that clogging has occurred in the LC or the mass spectrometry unit 2, so the process proceeds to Step S3 to identify the location where the clogging has occurred. In Step S3, the controller 100 switches the selector valve 5, connects the second flow path 12 to the mass spectrometry unit 2, and drives the liquid feed pump 3c to feed the solution from the solution tank 1c to the mass spectrometry unit 2 at a constant flow rate. Further, the controller 100 receives the pressure value of the liquid feed pump 3c from the pressure gauge 13c.

In Step S4, the controller 100 compares the output value of the pressure gauge 13c with a predetermined threshold value stored in the storage. The predetermined threshold value to be compared with the output value of the pressure gauge 13c is set based on, for example, the pressure in the absence of clogging. If the clogging occurs between selector valve 5 and the outlet of the ion source capillary, especially in the ion source capillary, the pressure measured by the pressure gauge 13c rises. Therefore, it can be determined whether there is clogging between the selector valve 5 and the capillary outlet of the ion source depending on whether the pressure measured by the pressure gauge 13c is equal to or higher than the threshold value.

When the pressure measured by the pressure gauge 13c is less than the threshold value (No), it can be assumed that there is no clogging between the selector valve 5 and the capillary outlet of the ion source, and the clogging occurs on the LC side, that is, the separation column 4. After that, the process proceeds to Step S5, and the user replaces the separation column 4. When the controller 100 detects that the separation column 4 has been replaced, the controller 100 switches the selector valve 5 to connect the first flow path 11 to the mass spectrometry unit 2, returns to Step S1, and returns to the normal measurement.

If the pressure measured by the pressure gauge 13c is equal to or higher than the threshold value (Yes), it can be seen that there is clogging between the selector valve 5 and the capillary outlet of the ion source. At this time, the controller 100 displays, for example, a message requesting maintenance for clearing the clogging of the ion source on the display, and stops the measurement operation.

After that, the process proceeds to Step S6, and the user performs a restoration process for clearing the clogging. As the restoration process, for example, the type or the flow rate of the solution in the solution tank 1c is changed. Since the second flow path 12 does not have a part having a small conductance such as the separation column 4 on the flow path, pressure can be directly applied to the clogged part by increasing the flow rate, and the clogging can be efficiently washed away. Further, by using a solvent that easily dissolves impurities (salts and polymers) that cause clogging as the solution to be introduced into the second flow path 12, the clogging can be efficiently removed. Specifically, as the solution to be introduced into the second flow path 12, an organic solvent such as pure water is suitable for dissolving salts and isopropanol is suitable for dissolving polymers. In this step, the controller 100 determines whether the output value of the pressure gauge 13c is less than a predetermined threshold value.

The controller 100 determines that the clogging has disappeared when the value of the pressure gauge 13c is less than the threshold value, switches the selector valve 5, connects the first flow path 11 to the mass spectrometry unit 2, returns to Step S1, and can return to normal measurement. It is also possible to add an internal standard substance having a known concentration to the solution flowing through the second flow path 12 in Step S6. In this case, by monitoring the signal strength of the internal standard substance in addition to the pressure value of the solution, it is possible to determine whether the state of the flow path has returned to normal.

Technical Effect

As described above, when the liquid chromatograph mass spectrometer according to this embodiment detects an abnormality, the liquid chromatograph mass spectrometer switches from the first flow path 11 to the second flow path that does not pass through the separation column 4, measures the pressure of the second flow path 12. When the pressure of the second flow path 12 is equal to or higher than the predetermined threshold value, it is possible to specify the location where the clogging has occurred as an ion source. Therefore, according to this embodiment, the location where the clogging has occurred can be automatically identified, and the recovering from the clogging can be achieved in a short time.

Second Embodiment

Apparatus Configuration

Figure 4:
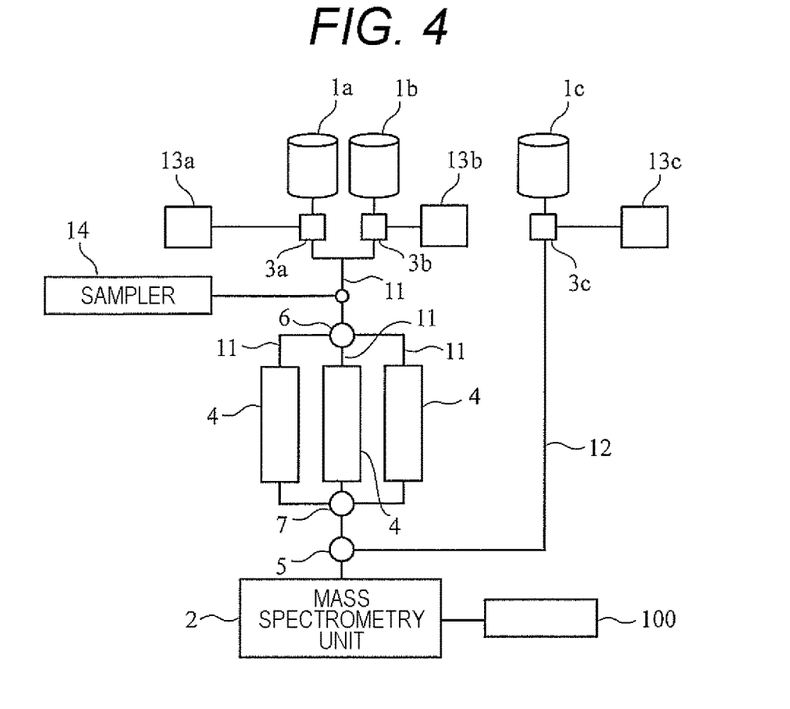
FIG. 4 is a schematic diagram illustrating a configuration of a liquid chromatograph mass spectrometer according to a second embodiment.

FIG. 4 is a schematic diagram illustrating a configuration of a liquid chromatograph mass spectrometer according to a second embodiment. As illustrated in FIG. 4, the liquid chromatograph mass spectrometer according to this embodiment is different from the first embodiment in that the first flow path 11 is branched into three, and each of the three separation columns 4 passes through the branched first flow path 11, and there are included selector valves and 7 (second valves) on the upstream side and the downstream side of the three separation columns 4, respectively. The characteristics of the plurality of separation columns 4 may be similar or different from each other. The controller 100 controls the drive of the selector valves 6 and 7 to select the separation column 4 to be used for measurement. The number of the separation columns 4 is not limited to three. Other configurations and operations are the same as those in the first embodiment, and thus the description thereof will be omitted.

Technical Effect

Since the liquid chromatograph mass spectrometer according to this embodiment has the plurality of separation columns 4, the characteristics of the plurality of separation columns 4 can be made different, and the separation column 4 can be selected according to the characteristics of the sample to be measured. Alternatively, analysis can be performed in parallel using a plurality of separation columns 4 having similar characteristics, and the sample can be introduced into the mass spectrometry unit 2 only for a time near the peak, which has an advantage that the throughput can be improved.

The liquid chromatograph mass spectrometer of this embodiment includes the plurality of separation columns 4, which increases the number of selector valves and complicates the flow path. In addition, the selector valves 6 and 7 may be clogged, or carryover may occur due to the sample remaining in the selector valves 6 and 7.

Here, in the liquid chromatograph sorting apparatus described in PTL 1, even if a plurality of separation columns are provided as in this embodiment and the pressure of the liquid feed pump is measured to detect clogging, it is not possible to specify whether the location where the clogging has occurred is the selector valve, the selector column, or the ion source. Therefore, it is troublesome because it is necessary for the user to specify the clogged location.

On the other hand, according to this embodiment, when an abnormality is detected, the first flow path 11 is switched to the second flow path 12 that does not pass through the separation column 4, and the pressure of the second flow path 12 is measured. When the pressure of the second flow path 12 is equal to or higher than the predetermined threshold value, it can be specified that the ion source is clogged, and when the pressure of the second flow path 12 is lower than the predetermined threshold value, it can be specified that any of the separation column 4 and the selector valves 6 and 7 is clogged. Therefore, according to this embodiment, the location where the clogging has occurred can be automatically identified, and the recovering from the clogging can be achieved in a short time.

Third Embodiment

Apparatus Configuration

Figure 5:
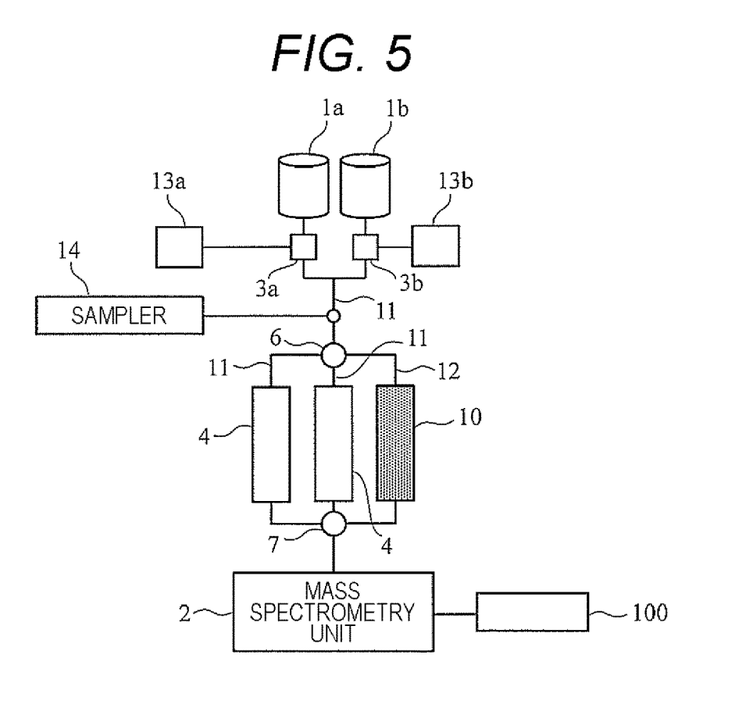
FIG. 5 is a schematic diagram illustrating a configuration of a liquid chromatograph mass spectrometer according to a third embodiment.

FIG. 5 is a schematic diagram illustrating a configuration of a liquid chromatograph mass spectrometer according to a third embodiment. As illustrated in FIG. 5, in this embodiment, at least one of the plurality of separation columns 4 provided in the liquid chromatograph mass spectrometer according to the second embodiment is a hollow dummy column 10, and the flow path can be switched by the selector valves 6 and 7 (second valves) provided in the upstream side and the downstream side of the separation column 4 and the dummy column 10 respectively. In this embodiment, among the flow paths between the selector valve 6 and the selector valve 7, the flow path that passes through the separation column 4 is referred to as the first flow path 11, and the flow path that passes through the dummy column 10 is referred to as the second flow path 12. In other words, the dummy column 10 is provided in parallel with the plurality of separation columns 4, and the second flow path 12 is a flow path passing through the dummy column 10.

The dummy column 10 is a hollow column without a filler inside. Therefore, the dummy column 10 has a larger conductance than the separation column 4.

The controller 100 connects any of the plurality of first flow paths 11 and the second flow path 12 to the mass spectrometry unit 2 by switching the selector valves 6 and 7. Since other apparatus configurations are the same as those of the first embodiment and the second embodiment, the description thereof will be omitted.

Operations

The operation of the liquid chromatograph mass spectrometer according to this embodiment will be described. In this embodiment, during the normal measurement (Step S1 illustrated in FIG. 3), liquid is fed from the solution tank 1a by the liquid feed pump 3a (first liquid feed pump). If it is determined to be abnormal during the normal measurement (Yes in Step S2 illustrated in FIG. 3), the controller 100 switches the selector valves 6 and 7 (Step S3) to connect the second flow path 12 passing through the dummy column 10 to the mass spectrometry unit 2. Then, the controller 100 feeds the solution from the solution tank 1b by the liquid feed pump 3b (second liquid feed pump), and measures the pressure of the second flow path 12 by the pressure gauge 13b (Step S4). Since other operations are the same as the operations in the first embodiment, detailed description thereof will be omitted.

Technical Effect

As described above, according to this embodiment, the second flow path 12 is configured to pass through the dummy column 10 provided in parallel with the separation column 4 of the first flow path 11 instead of the piping as in the first embodiment. Therefore, it is possible to simplify the configuration of the apparatus without the need of any special flow path, and reduce the manufacturing cost. Further, since the dummy column 10 can be removed like the separation column 4, it can be easily replaced with another column. Furthermore, since it is possible to determine whether there is clogging between the liquid feed pump 3b and the capillary outlet of the ion source, it is possible to automatically specify whether the clogging occurs on the separation column 4 side or the ion source side, and it can be recovered from the clogging in a short time.

Fourth Embodiment

Apparatus Configuration

Figure 6:
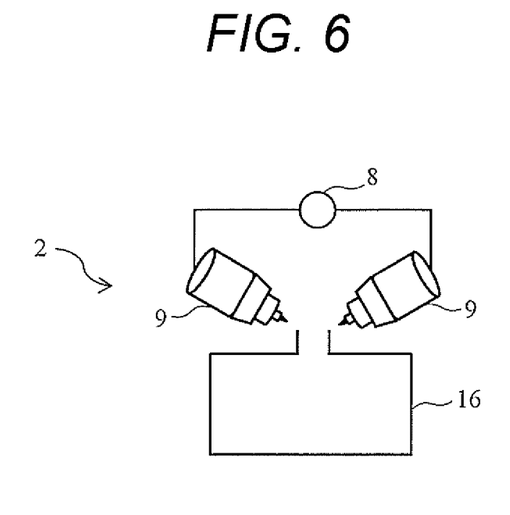
FIG. 6 is a schematic diagram illustrating a configuration of a mass spectrometry unit according to a fourth embodiment.

A liquid chromatograph mass spectrometer according to a fourth embodiment will be described. FIG. 6 is a schematic diagram illustrating a configuration of a mass spectrometry unit according to the fourth embodiment. As illustrated in FIG. 6, the liquid chromatograph mass spectrometer of this embodiment is different from the first embodiment in that the mass spectrometry unit 2 has two or more ion source probes 9, and a selector valve 8 (third valve) for switching between a plurality of ion source probes are included. Switching of the selector valve 8 is controlled by the controller 100. Although not illustrated, the ion source probe 9 has a capillary, and the outlet of the capillary is arranged toward a vacuum chamber 16. Since other apparatus configurations are the same as those in the first embodiment, description thereof will be omitted.

Operations

The operation of the liquid chromatograph mass spectrometer according to this embodiment will be described. The operation of this embodiment is almost the same as that of the first embodiment, but is different from the first embodiment in that, at the time of normal measurement (Step S1 in the first embodiment), one of the plurality of ion source probes 9 is used, and when it is determined that the ion source is clogged (Yes in Step S4), the controller 100 switches the selector valve 8 in Step S5 to connect another ion source probe to the mass spectrometry unit 2. In this way, when it is determined that the ion source is clogged, it is possible to recover from the clogging more reliably and in a short time by switching the ion source probe 9.

Technical Effect

As described above, in this embodiment, as in the first embodiment, the liquid chromatograph mass spectrometer is configured to switch from the first flow path 11 to the second flow path 12 that does not pass through the separation column 4 when an abnormality is detected so as to measure the pressure of the second flow path 12. As a result, according to this embodiment, the location where the clogging has occurred can be automatically identified, and the recovering from the clogging can be achieved in a short time. Further, this embodiment has a configuration in which the flow path is switched to another ion source probe 9 when it is determined that there is clogging between the selector valve 5 and the capillary outlet of the ion source. As a result, it is possible to recover from the clogging more reliably and in a short time.

MODIFICATIONS

The present disclosure is not limited to the examples described above, but includes various modifications. For example, the above embodiments have been described in detail for easy understanding of the present disclosure, and the invention does not necessarily have all the configurations described. In addition, some of certain embodiment can be replaced with the configuration of the other embodiment. Further, it is possible to add the configuration of one embodiment to the configuration of another embodiment. It is also possible to add, delete, or replace a part of the configuration of another embodiment with respect to a part of the configuration of each embodiment.

REFERENCE SIGNS LIST 1a-1c solution tank
2 mass spectrometry unit
3a-3c liquid feed pump
4 separation column
5-8 selector valve
9 ion source probe
10 dummy column
11 first flow path
12 second flow path
13a-13c pressure gauge
14 sampler
15 waste liquid tank
16 vacuum chamber

The invention claimed is:

1. A liquid chromatograph mass spectrometer, comprising:
a first flow path that passes through a separation column;
a second flow path that does not pass through the separation column;
a mass spectrometry unit that is provided on a downstream side of the first flow path and the second flow path and analyzes a sample that has passed through the first flow path;
a first valve that connects any one of the first flow path and the second flow path to the mass spectrometry unit;
a first liquid feed pump that feeds liquid to the first flow path;
a second liquid feed pump that feeds liquid to the second flow path;
a controller that controls driving of the first valve, the first liquid feed pump, and the second liquid feed pump; and
a pressure gauge that measures a pressure of the second flow path and outputs the pressure to the controller,
wherein the controller is programmed to
connect the first flow path to the mass spectrometry unit when the sample is analyzed in the mass spectrometry unit and feed liquid to the mass spectrometry unit from the first liquid feed pump through the first flow path, and
connect the second flow path to the mass spectrometry unit, and drive the first valve, the first liquid feed pump, and the second liquid feed pump to feed liquid from the second liquid feed pump to the mass spectrometry unit through the second flow path in a case where it is determined to be abnormal when a measured value of the mass spectrometry unit and a predetermined threshold value are compared.

2. The liquid chromatograph mass spectrometer according to claim 1, wherein, after driving the first valve, the controller determines whether an ion source of the mass spectrometry unit is clogged based on the pressure of the second flow path measured by the pressure gauge.

3. The liquid chromatograph mass spectrometer according to claim 2, wherein, when it is determined that clogging does not occur in the ion source of the mass spectrometry unit, the controller determines that clogging occurs on a side of the separation column.

4. The liquid chromatograph mass spectrometer according to claim 1 wherein the first liquid feed pump and the second liquid feed pump feed liquid at different pressures.

5. The liquid chromatograph mass spectrometer according to claim 1, further comprising:
- a plurality of the first flow paths;
- a plurality of the separation columns, each of which is provided in the plurality of the first flow paths; and
- a second valve that switches a flow path to any of the plurality of the first flow paths.

6. The liquid chromatograph mass spectrometer according to claim 5, further comprising:
- a hollow column that is provided in parallel with the plurality of the separation columns,
- wherein the second flow path is a flow path that passes through the hollow column, and
- the second valve switches a flow path to any of the plurality of the first flow paths and the second flow path.

7. The liquid chromatograph mass spectrometer according to claim 1, wherein
- the mass spectrometry unit includes a plurality of ion source probes and a third valve that switches the plurality of ion source probes, and
- the controller drives the first valve to connect the second flow path to the mass spectrometry unit and then drives the third valve to switch the plurality of ion source probes.

* * * * *